(12) United States Patent
Nemeth et al.

(10) Patent No.: US 11,973,719 B2
(45) Date of Patent: Apr. 30, 2024

(54) MECHANISMS FOR FEEDBACK OF MULTIPLE HARQ PROCEDURES IN A SLOT IN MOBILE COMMUNICATIONS

(71) Applicant: MediaTek Singapore Pte. Ltd., Singapore (SG)

(72) Inventors: Jozsef Nemeth, Cambridge (GB); Mohammed S Aleabe Al-Imari, Cambridge (GB); Abdelkader Medies, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 395 days.

(21) Appl. No.: 16/581,718

(22) Filed: Sep. 24, 2019

(65) Prior Publication Data

US 2020/0106586 A1 Apr. 2, 2020

Related U.S. Application Data

(60) Provisional application No. 62/737,253, filed on Sep. 27, 2018.

(51) Int. Cl.
*H04W 72/04* (2009.01)
*H04L 1/1812* (2023.01)
(Continued)

(52) U.S. Cl.
CPC .......... *H04L 5/0055* (2013.01); *H04L 1/1812* (2013.01); *H04W 72/0446* (2013.01)

(58) Field of Classification Search
CPC ... H04L 1/1812; H04L 1/1854; H04L 1/1896; H04L 5/0055; H04W 72/0446;
(Continued)

(56) References Cited

U.S. PATENT DOCUMENTS

| 2016/0020891 | A1 | 1/2016 | Jung et al. |
| 2016/0128055 | A1 | 5/2016 | Xiong et al. |

(Continued)

FOREIGN PATENT DOCUMENTS

CN 108293268 A 7/2018

OTHER PUBLICATIONS

Taiwan Intellectual Property Office, Office Action for Taiwan Patent Application No. 108134861, Dec. 30, 2021.
(Continued)

*Primary Examiner* — Khaled M Kassim
*Assistant Examiner* — Zhaohui Yang
(74) *Attorney, Agent, or Firm* — Han IP PLLC; Andy M. Han

(57) ABSTRACT

Various solutions pertaining to mechanisms for feedback of multiple HARQ procedures in a same slot in mobile communications are described. An apparatus receives a plurality of downlink (DL) transmissions from a network node of a wireless network. The apparatus constructs a feedback containing a plurality of hybrid automatic repeat request (HARQ) acknowledgements (HARQ-ACKs) for the plurality of DL transmissions. The apparatus then performs an uplink (UL) transmission of the feedback to the network node in a slot comprising a plurality of sub-slots, with each of the plurality of HARQ-ACKs being in a respective one of the plurality of sub-slots in the slot.

16 Claims, 6 Drawing Sheets

(51) Int. Cl.
*H04L 5/00* (2006.01)
*H04W 72/0446* (2023.01)

(58) Field of Classification Search
CPC ......... H04W 72/1289; H04W 72/0413; H04W 72/042; H04W 72/044; H04W 72/121; H04W 72/1284; H04W 76/27; H04W 84/042
See application file for complete search history.

(56) References Cited

U.S. PATENT DOCUMENTS

| | | | |
|---|---|---|---|
| 2019/0223199 A1* | 7/2019 | Park | H04L 1/1861 |
| 2019/0253986 A1* | 8/2019 | Jeon | H04W 72/042 |
| 2019/0306923 A1* | 10/2019 | Xiong | H04J 13/0062 |
| 2020/0007298 A1* | 1/2020 | Korhonen | H04L 1/1861 |
| 2020/0067574 A1* | 2/2020 | Yang | H04B 7/0417 |
| 2020/0154411 A1* | 5/2020 | Liu | H04W 72/23 |
| 2021/0266893 A1* | 8/2021 | Lee | H04W 72/0413 |
| 2022/0116152 A1* | 4/2022 | Iyer | H04L 1/188 |

OTHER PUBLICATIONS

China National Intellectual Property Administration, International Search Report and Written Opinion for PCT/CN2019/108387, Jan. 2, 2020.

LG Electronics, Discussion on scheduling in time domain for NR, 3GPP TSG RAN WG1 meeting #87, R1-1611846, Reno, USA, Nov. 14-18, 2016.

LG Electronics, Discussion on scheduling in time domain for NR, 3GPP TSG RAN WG1 NR-AdHoc meeting, R1-1700509, Spokane, USA, Jan. 16-20, 2017.

Sharp, PUCCH enhancements for URLLC HARQ-ACK feedback, 3GPP TSG RAN WG1 Meeting #94, R1-1809112, Gothenburg, Sweden, Aug. 20-24, 2018.

China National Intellectual Property Administration, First Office Action in China Patent Application No. 201980063920.9, Apr. 22, 2023.

Nokia et al: "On remaining details of HARQ procedure", 3GPP TSG RAN WG1 Meeting 91, R1-1720480, Reno, USA, Nov. 27-Dec. 1, 2017.

* cited by examiner

MECHANISMS FOR FEEDBACK OF MULTIPLE HARQ PROCEDURES IN A SLOT IN MOBILE COMMUNICATIONS

CROSS REFERENCE TO RELATED PATENT APPLICATION(S)

The present disclosure is part of a non-provisional application claiming the priority benefit of U.S. patent application Ser. No. 62/737,253, filed on 27 Sep. 2018, the content of which is incorporated by reference in its entirety.

TECHNICAL FIELD

The present disclosure is generally related to mobile communications and, more particularly, to mechanisms for feedback of multiple hybrid automatic repeat request (HARQ) procedures in a same slot in mobile communications.

BACKGROUND

Unless otherwise indicated herein, approaches described in this section are not prior art to the claims listed below and are not admitted as prior art by inclusion in this section.

The physical layer (PHY) standard under release 15 (Rel-15) of the $3^{rd}$ Generation Partnership Project (3GPP) specification allows for a single HARQ acknowledgement (HARQ-ACK) reporting opportunity per uplink (UL) slot. HARQ-ACK information on multiple downlink (DL) transmissions from multiple DL slots are gathered into a common codebook. This benefits throughput and simplifies intra-user equipment (intra-UE) multiplexing, which were of major concerns for enhanced mobile broadband (eMBB) traffic. Under the Rel-15 specification, each HARQ codebook is uniquely identified by the UL slot appointed for ACK-reporting. Additionally, each DL transmission of downlink control information (DCI) contains an index to a table of time offsets. The selected time offset K1 denotes the number of UL slot boundaries between the end of a physical downlink shared channel (PDSCH) scheduled by a current DCI and an ACK-reporting slot. Within this ACK-reporting slot, the specific physical uplink control channel (PUCCH) resource is selected by the PUCCH resource indicator (PRI) (or alternatively referred to as acknowledgement resource indicator (ARI)) contained in the DCI.

For a specific UL slot, the HARQ codebook is determined (e.g., finalized) at a well-defined time offset, or guard gap, preceding the first symbol of the PUCCH resource selected by the last DCI pointing to the ACK-reporting slot. Before this happens, if at any time a DL transmission of DCI pointing to some ACK-reporting UL slot is successfully deduced, then the PUCCH resource is overridden by such DCI, and the ACK-information from the associated PDSCH decoding is added to the codebook. After the HARQ codebook has been determined, no more DL DCI's can schedule ACK-information feedback to the same UL slot.

In release 16 (Rel-16) of the 3GPP specification, the above-described ACK-reporting mechanism needs enhancement to meet reliability and latency requirements of ultra-reliable low-latency communication (URLLC) traffic. However, one issue is that HARQ processes need to wait for each other if multiplexing into a common codebook cannot be avoided. A second issue is that the PUCCH resource needs to meet the reliability requirement of the most critical HARQ-ACK information, which is wasteful. These issues are particularly significant in the case of having simultaneous mixed service type traffic within the same UE. A third issue is that the opportunities for HARQ codebook transmission are restricted according to the definition in Rel-15.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to mechanisms for feedback of multiple HARQ procedures in a same slot in mobile communications.

In one aspect, a method may involve an apparatus receiving a plurality of DL transmissions from a network node of a wireless network. The method may also involve the apparatus constructing a feedback containing a plurality of HARQ-ACKs for the plurality of DL transmissions. The method may further involve the apparatus performing an UL transmission of the feedback to the network node in a slot comprising a plurality of sub-slots, with each of the plurality of HARQ-ACKs being in a respective one of the plurality of sub-slots in the slot.

In one aspect, an apparatus may include a transceiver and a processor coupled to the transceiver. The transceiver may be configured to wirelessly communicate with a network node of a wireless network. The processor may be configured to perform certain operations. For instance, the processor may receive, via the transceiver, a plurality of DL transmissions from a network node of a wireless network. The processor may also be configured to construct a feedback containing a plurality of HARQ-ACKs for the plurality of DL transmissions. The processor may be further configured to perform, via the transceiver, an UL transmission of the feedback to the network node in a slot comprising a plurality of sub-slots, with each of the plurality of HARQ-ACKs being in a respective one of the plurality of sub-slots in the slot and with the plurality of sub-slots having non-uniform sub-slot sizes.

It is noteworthy that, although description provided herein may be in the context of certain radio access technologies, networks and network topologies such as 5th Generation (5G) and New Radio (NR), the proposed concepts, schemes and any variation(s)/derivative(s) thereof may be implemented in, for and by other types of radio access technologies, networks and network topologies such as, for example and without limitation, such as Long-Term Evolution (LTE), LTE-Advanced, LTE-Advanced Pro, Internet-of-Things (IoT), Narrow Band Internet of Things (NB-IoT) and any future-developed communication/networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to mechanisms for feedback of multiple HARQ procedures in a same slot in mobile communications. According to the present disclosure, a number of possible concepts, solutions, schemes, designs, techniques and methods may be implemented separately or jointly. That is, although various possible schemes may be described below separately, two or more of various possible schemes may be implemented in one combination or another.

Figure 1:
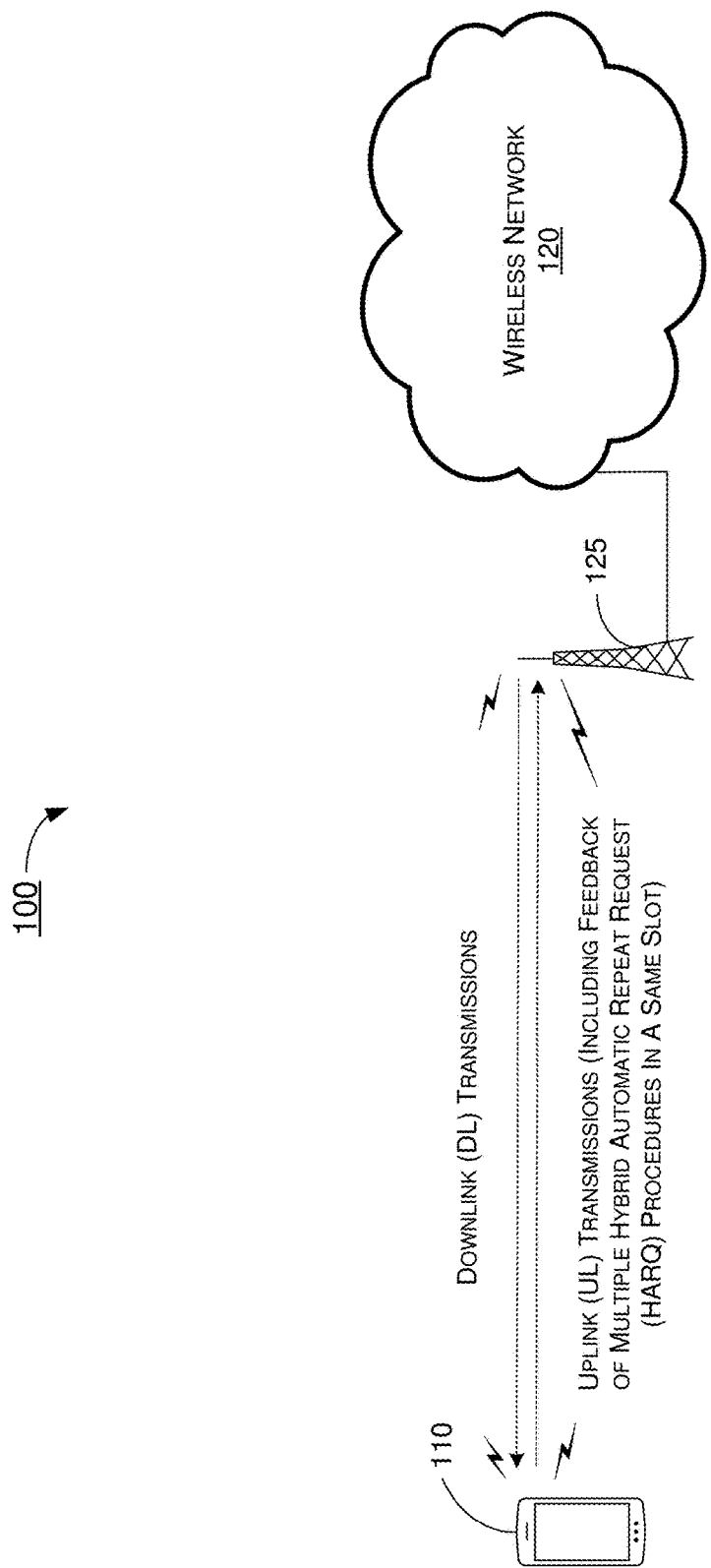
FIG. 1 is a diagram of an example network environment in which various solutions and schemes in accordance with the present disclosure may be implemented.
Figure 2:
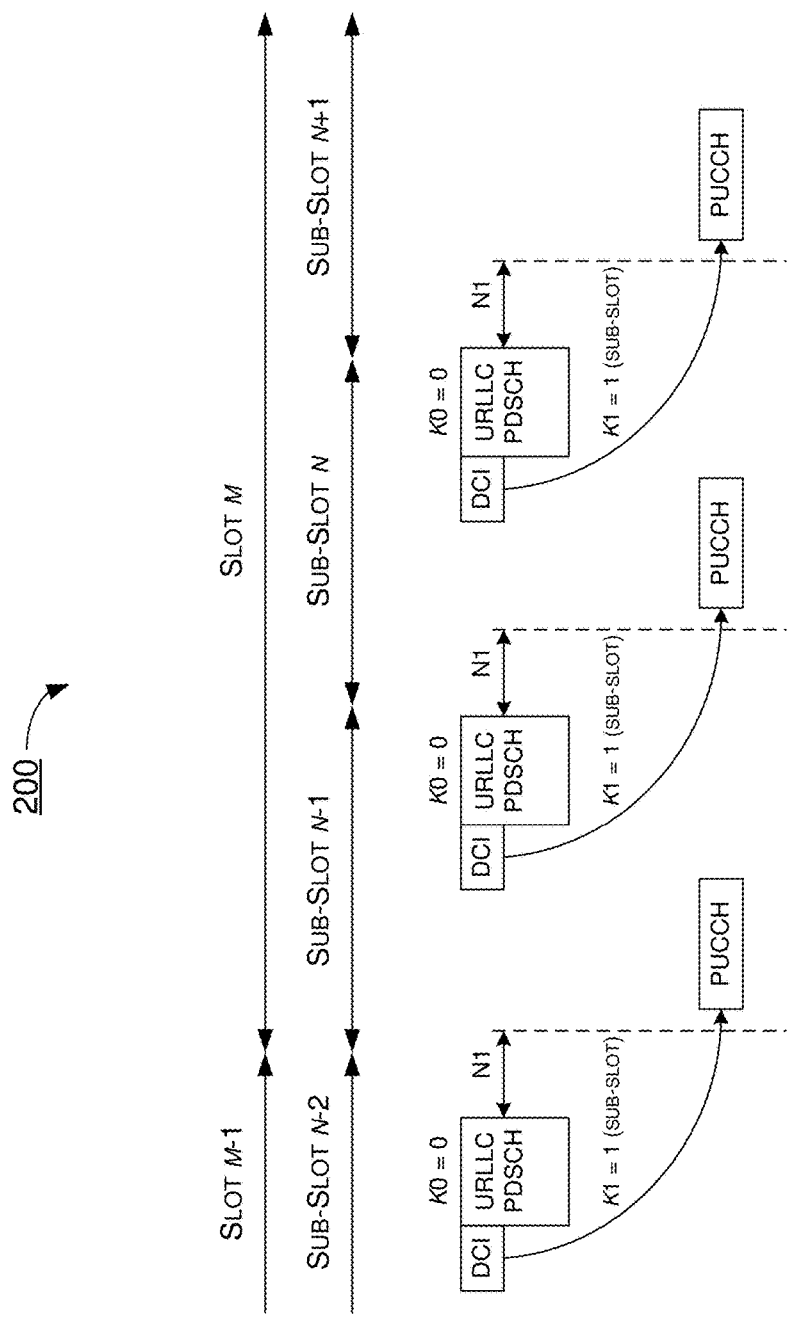
FIG. 2 is a diagram depicting an example scenario under proposed schemes in accordance with implementations of the present disclosure.
Figure 3:
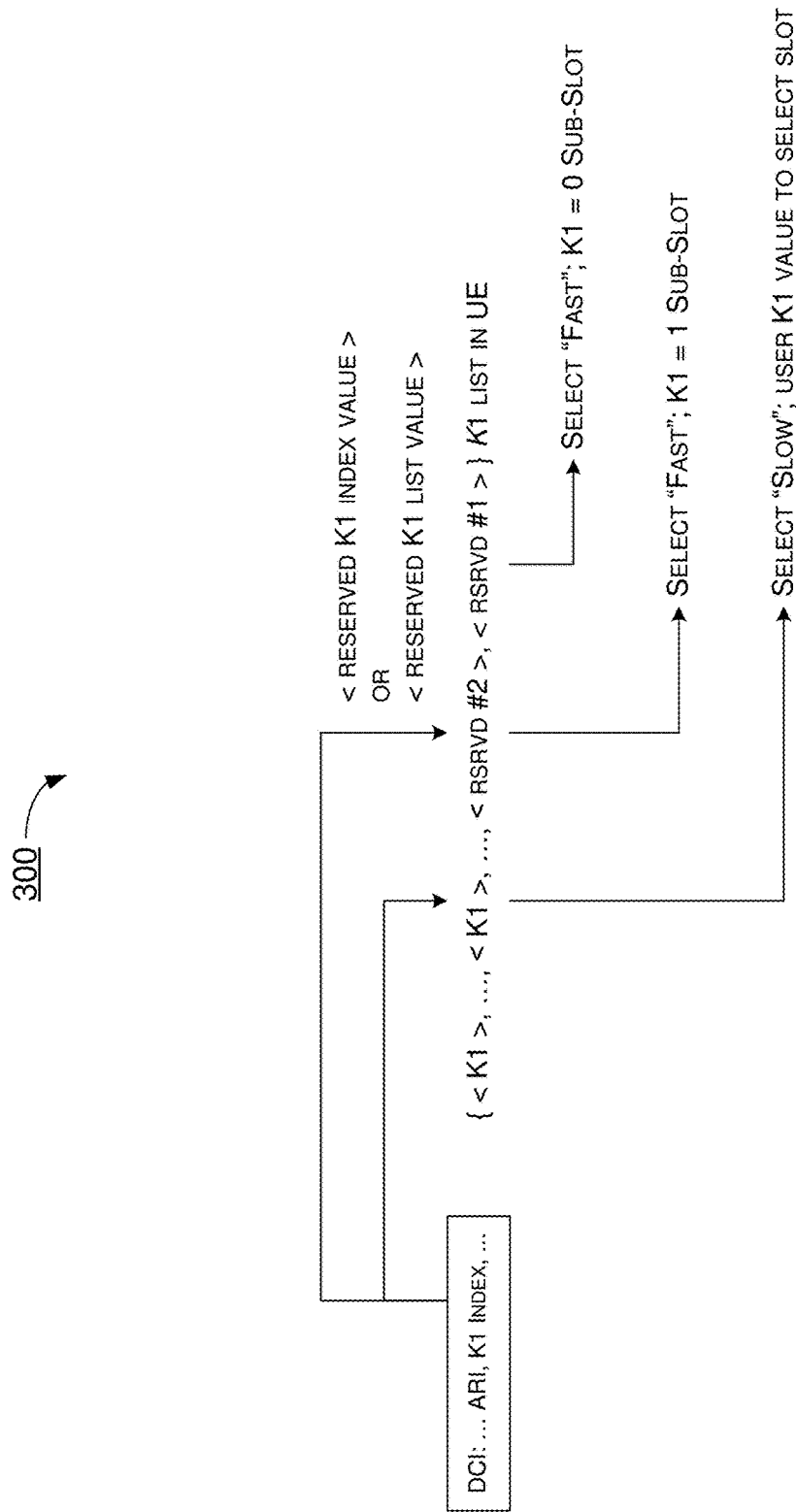
FIG. 3 is a diagram depicting an example scenario under proposed schemes in accordance with implementations of the present disclosure.
Figure 4:
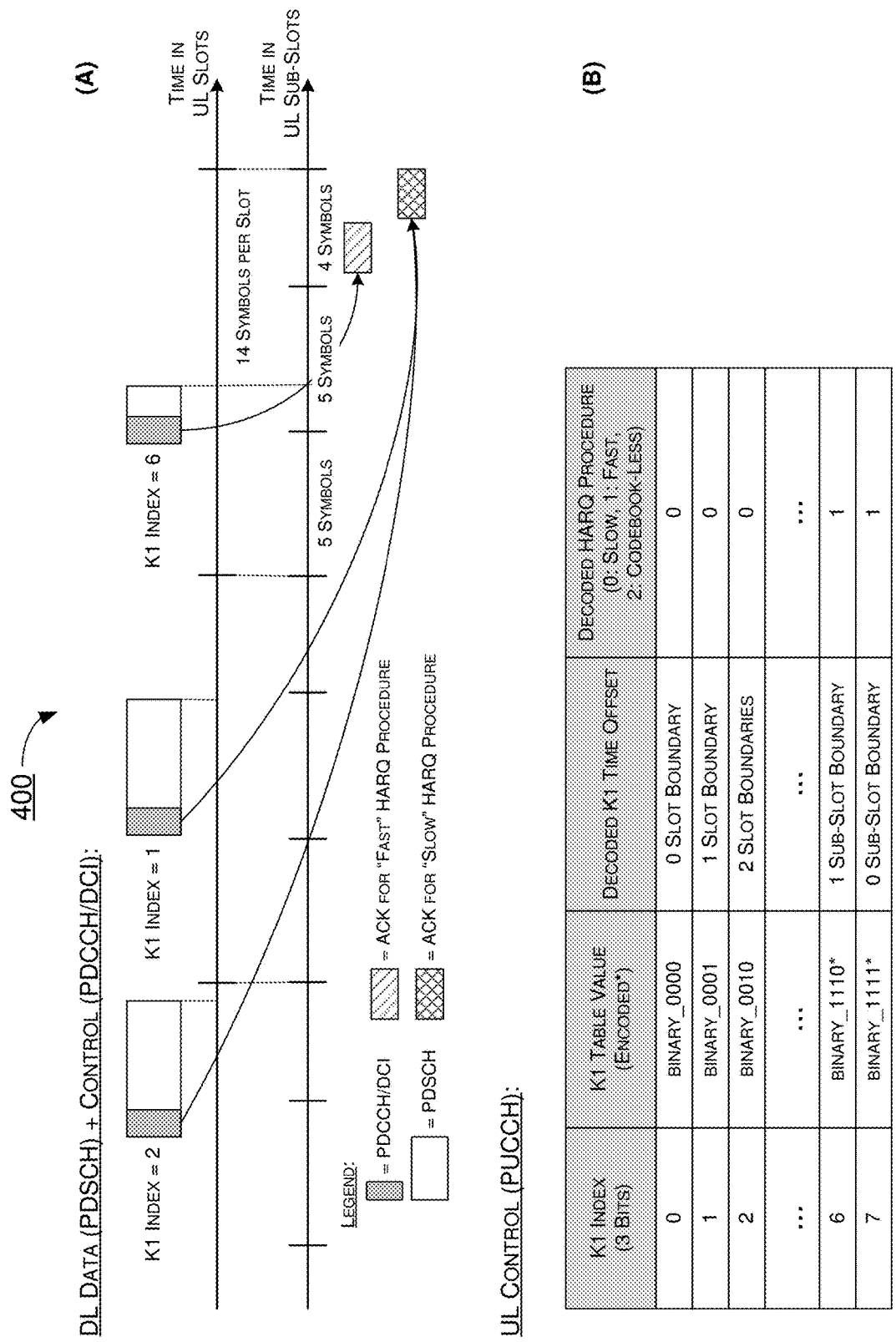
FIG. 4 is a diagram depicting an example table under proposed schemes in accordance with implementations of the present disclosure.

FIG. 1 illustrates an example network environment 100 in which various concepts, solutions, schemes, designs, techniques and methods in accordance with the present disclosure may be implemented. FIG. 2 illustrates an example scenario 200 under proposed schemes in accordance with implementations of the present disclosure. FIG. 3 illustrates an example scenario 300 under proposed schemes in accordance with implementations of the present disclosure. FIG. 4 illustrates an example scenario 400 under proposed schemes in accordance with implementations of the present disclosure. Each of scenarios 200, 300 and 400 may be implemented in network environment 100. The following description of various proposed schemes is provided with reference to FIG. 1-FIG. 4.

Referring to FIG. 1, network environment 100 may involve a UE 110 in wireless communication with a wireless network 120 (e.g., a 5G NR mobile network) via a base station 125 (e.g., an eNB, a gNB or a transmit-receive point (TRP)). In network environment 100, UE 110 and wireless network 120 may implement various schemes pertaining to mechanisms for feedback of multiple HARQ procedures in a same slot in mobile communications in accordance with the present disclosure, as described below.

For DL URLLC traffic, HARQ feedback delay should be reduced at the expense of less multiplexing, hence less throughput/spectral efficiency. Thus, the determination of HARQ codebook should be based on ACK-reporting UL sub-slots indicated by K1. A configurable number of three or four sub-slots per slot may be required, which implies non-uniform sub-slot sizes. The smaller the sub-slot size, less multiplexing becomes possible because PUCCH overriding is restricted within a given sub-slot. Thus, under a proposed scheme in accordance with the present disclosure, larger sub-slots may be configured while codebook-less HARQ transmission on separate PUCCH resource(s) as a dynamically selectable option may be allowed. To further reduce delay, a reduced N1 timeline for codebook-less HARQ should be defined since PUCCH format 0 or 1 is used (as both are short, pre-stored sequences in frequency domain).

In mixed traffic scenarios (URLLC and eMBB), multiplexing of ACK information should be avoided in the event of very different reliability and latency constraints. Thus, it is conceivable to allow for dynamic selection between two HARQ codebooks within the same ACK-reporting slot. One option may be to reuse existing fields for signaling, as this would avoid unnecessary signaling overhead in DL DCI content. On the other hand, this approach should not cause considerable restrictions to the freedom of scheduling. Accordingly, under a proposed scheme in accordance with the present disclosure, the K1 field may be reused. A small number of special values (e.g., two) may be sufficient for both selecting the faster ACK-feedback option and its sub-slot.

Moreover, dynamically selected HARQ-ACK feedback option should not be limited to the codebook instance, and separate configurations and PUCCH allocations should be included. This is justified by the different needs of eMBB and URLLC. That is, URLLC may require finer time distribution of PUCCH resources that can carry small HARQ codebooks. Additionally, URLLC may require more robust PUCCH formats. Furthermore, dynamic format (e.g., Type-2) codebook may be more suitable for URLLC due to the small HARQ codebook size and efficient format, while at the same time semi-static (e.g., Type-1) codebook format may be the convenient robust solution for eMBB HARQ-ACK feedback. Besides, eMBB would not benefit from the sub-slot partitioning, whereas the signaling overhead may be increased for a given range of physical downlink control channel (PDCCH)-to-physical uplink control channel (PUCCH) time offsets to cover.

In view of the above, the present disclosure proposes a solution or scheme with respect to non-uniform sub-slot sizes. Additionally, the present disclosure proposes a solution or scheme with respect to reduced N1 timeline with codebook-less HARQ. Furthermore, the present disclosure proposes a solution or scheme with respect to the following concepts: (a) two or more simultaneous codebooks (herein interchangeably referred to as "procedures") within the same slot/sub-slot, (b) separate PUCCH allocations and configurations per procedure, and (c) dynamic switching between procedures using special reserved K1 value(s).

Under one or more of the various proposed schemes in accordance with the present disclosure, configuration of non-uniform ACK-reporting UL sub-slot sizes may be allowed for partitioning. Specifically, the value of K1 may indicate the number of UL sub-slot boundaries between an ending symbol of a PDSCH and an ACK-reporting sub-slot or, equivalently, a starting symbol of a PUCCH that carries the HARQ-ACK feedback.

Referring to FIG. 2, in scenario 200, determination of a single HARQ codebook may be performed on a per-sub-slot basis. Accordingly, K1 mapping may be redefined to represent a time offset expressed in sub-slots. For instance, a slot may be subdivided into two, seven or fourteen sub-slots of equal size in symbol length. Alternatively, sub-slots may have non-uniform lengths (e.g., three sub-slots with lengths of 5 symbols, 5 symbols and 4 symbols, respectively). Moreover, K0 may be expressed in slots or sub-slots (similar to K1). In the example shown in FIG. 2, as K1=1 (indicating one UL sub-slot boundary between an ending symbol of a PDSCH and an ACK-reporting sub-slot or a starting symbol of a PUCCH that carries the HARQ-ACK feedback), UE 110 may transmit a PUCCH containing ACK-information in a second sub-slot that is immediately subsequent a first sub-slot in which a DCI/PDSCH is received from base station 125.

Under one or more of the various proposed schemes in accordance with the present disclosure, the value of N1, which is related to UE processing timeline, may be reduced for codebook-less HARQ. The motivation here includes providing simple and tailored definition for low-latency ACK and negative acknowledgement (NACK) sending per DL data. The motivation also includes reducing PDSCH-to-HARQ latency bound.

Under a proposed scheme in accordance with the present disclosure, with respect to HARQ feedback for a single DCI, the value of K1 may be interpreted as sub-slots or symbols. For instance, reduced PDSCH-to-HARQ processing time bounds (as denoted by N1 #) may be defined and applicable with each of the existing UE capabilities classes with one or more of the following conditions being true: (a) codebook-less HARQ being used, (b) no code block group (CBG)-HARQ, (c) no multiple codewords (CWs), (d) not a retransmission (no soft-combing), and (e) PUCCH-resource-set-O being used (e.g., short-PUCCH-format being transmitted). Alternatively, or additionally, under the proposed scheme, CBG-HARQ, multiple CWs and spatial bundling may be supported. Moreover, under the proposed scheme, out-of-order HARQ may also be supported.

Under one or more of the various proposed schemes in accordance with the present disclosure, two HARQ-ACK codebooks and any number of codebook-less HARQ-ACK feedback may be sent within the same UL sub-slot, and a PHY indication may be used for dynamic selection between them. Under the proposed schemes, in the determination of the codebook, HARQ-ACK information not assigned to the current HARQ codebook may be handled identically to HARQ-ACK information sent in different sub-slots or slots. Moreover, the PHY indication may be based on special K1 values or indices. Additionally, the PHY indication may also select between separate HARQ configurations (e.g., codebook formats) and PUCCH allocations.

Under a proposed scheme in accordance with the present disclosure, with respect to dynamic switching between HARQ procedures, separate PUCCH resources and HARQ codebook determination methods may be used to report HARQ information for URLLC and eMBB traffics to achieve efficient mixing thereof. Under the proposed scheme, UE 110 may be configured with two or more HARQ codebook determination methods (herein interchangeably referred to as "HARQ procedures"). One method ("slow") may support more efficient reporting while the other method ("fast") may support lower latency (e.g., Type-1 and Type-3, or Type-2 and Type-2-with-redefined-K1-mapping). Each HARQ procedure may be assigned separate PUCCH resource sets and configuration parameters.

Under the proposed scheme with respect to dynamic switching between HARQ procedures, UE 110 may operate the two HARQ codebook determination methods simultaneously, and UE 110 may channel the received DCI's and configured semi-persistent scheduling (SPS) PDSCH streams onto one or the other codebook determination method (but not both). Base station 125 may apply some signaling method for each DL data transmission to indicate the HARQ procedure to use.

Under the proposed scheme with respect to dynamic switching between HARQ procedures, in an event that a particular DL transmission is reported in a current slot but is channelized to a concurrent HARQ procedure, then the current HARQ codebook determination may not report HARQ information for it. Rather, it should be treated the same way as if the HARQ reporting was scheduled to a different slot.

Under the proposed scheme with respect to dynamic switching between HARQ procedures, the applicable HARQ procedure for each DCI may be signaled accordingly. Under the proposed, some reserved values may be applied in the encoding of the K1 list elements. For instance, K1=reserved_0 may indicate K1=0 and "fast" HARQ procedure being applied, K1=reserved_1 may indicate K1=1 and "fast" HARQ procedure being applied. Otherwise, "slow" HARQ procedure may be applied, and the actual values may be the two greatest representable numbers in the range, namely: reserved_0=14 and reserved_0=15.

Under the proposed scheme, radio resource control (RRC)-configurable selection of HARQ procedure may be based on the type of DCI. That is, RRC configurability per DL DCI type may be supported (e.g., compact DCI, DCI_1_1). Additionally, default configurations may be defined. Alternatively, or additionally, RRC-configurable selection of HARQ procedure may be based on the search space or radio network temporary identifier (RNTI) (e.g., modulation coding scheme cell RNTI (MCS-C-RNTI)). Additionally, or alternatively, a combination of some or more of the above may be utilized. For instance, in an event that one or more of multiple predefined conditions is/are true then a specific HARQ procedure may be selected.

Referring to FIG. 3, in scenario 300, special K1 index may be utilized to select between codebook-based HARQ and codebook-less HARQ. In scenario 300, dynamic selection between "slow" and "fast" HARQ-ACK feedback options may be implemented by separate codebooks. The selection may require a PHY indication. Under a proposed scheme in accordance with the present disclosure, the PHY indication may be based on reserved special values in the K1 index field or a K1 table stored in UE 110. Any overlap between the configured values K1=0, 1 between "slow" and "fast" HARQ-ACK feedback may not be excluded. Under the proposed scheme, one of the signaling options used for codebook selection may be used with codebook-less HARQ as well. A special K1 index may be defined for selecting codebook-less sending when high-priority HARQ transmission has been indicated. As shown in FIG. 4, in an event that K1 is not inferred, then multiple special K1 indices may need to be selected.

Referring to part (A) of FIG. 4, in scenario 400, a non-latency-critical ("slow") HARQ procedure may be selected for two DL transmissions, and the ACK-information of these two DL transmissions may be multiplexed into the same HARQ codebook. Meanwhile, another HARQ codebook (close in time, and out-of-order) may also be transmitted on a separate PUCCH resource, carrying the ACK-information for a third DL packet, for which a latency-critical ("fast") HARQ procedure may be selected. In scenario 400, the selection of the HARQ procedures may occur by way of mapping specific K1 indices or K1 values to different HARQ procedures as shown in the table in part (B) of FIG. 4, which may be stored in UE 110 and base station 125. In the example shown in FIG. 4, one of the two DL transmissions may have a K1 index value of 2 indicated in DCI, which corresponds to "0" for selection of a respective "slow" HARQ procedure according to the table in part (B) of FIG. 6, and the other of the two DL transmissions may have a K1 index value of 1 indicated in DCI, which corresponds to "0" for the selection of the respective "slow" HARQ procedure according to the table in part (B) of FIG. 6. On the other hand, the third DL transmission may have a K1 index value of 6 indicated in DCI, which corresponds to "1" for the selection of a respective "fast" HARQ procedure according to the table in part (B) of FIG. 6. Although not shown in FIG. 4, the PUCCH resources may be selected from PUCCH allocations separately configured for the "slow" and "fast" HARQ procedures. The two PUCCH's may use a respective HARQ codebook format configured for the selected procedure, which may be different for each procedure.

Illustrative Implementations

Figure 5:
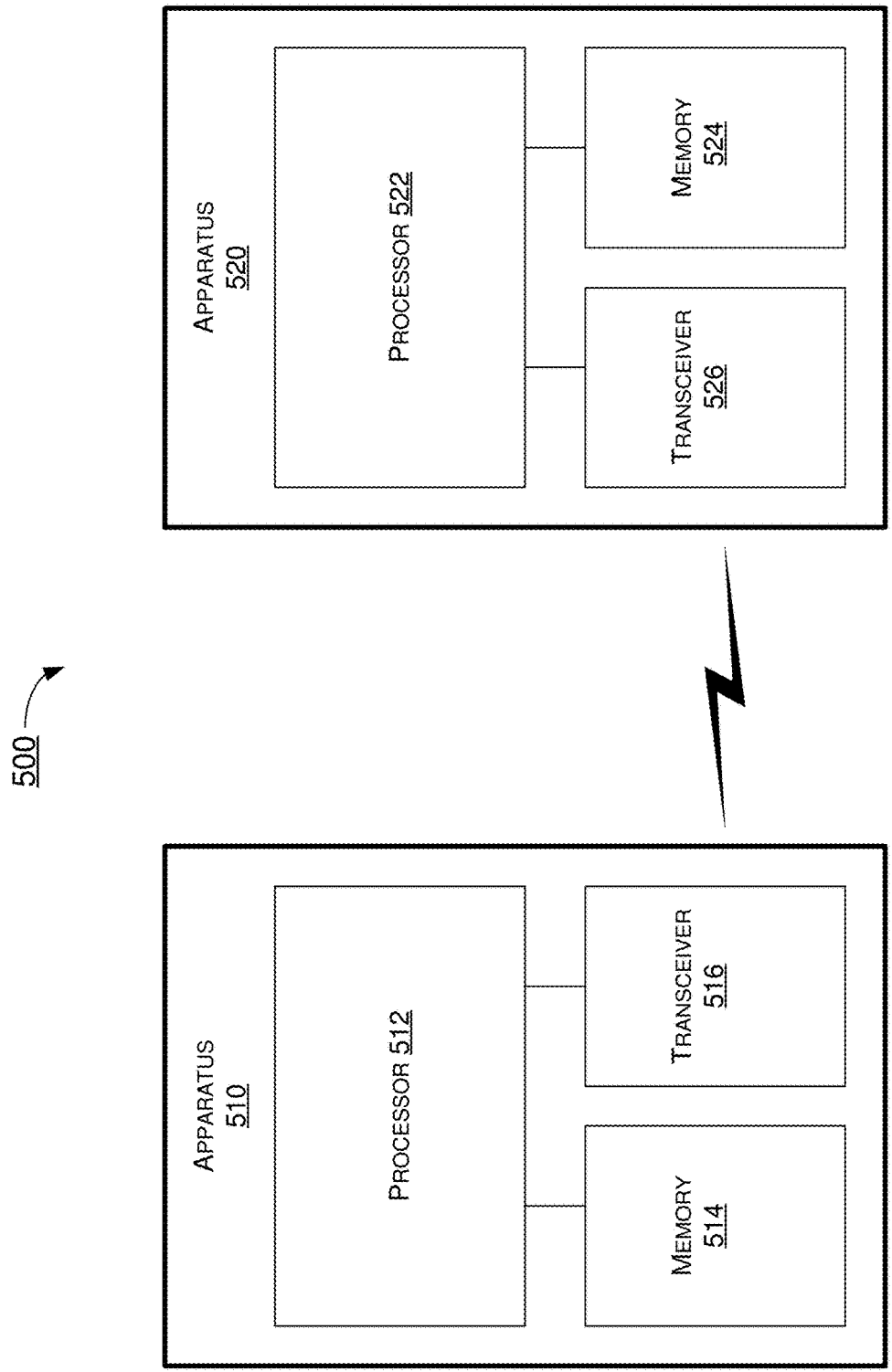
FIG. 5 is a block diagram of an example communication system in accordance with an implementation of the present disclosure.

FIG. 5 illustrates an example communication system 500 including an example apparatus 510 and an example apparatus 520 in accordance with an implementation of the present disclosure. Each of apparatus 510 and apparatus 520 may perform various functions to implement schemes, techniques, processes and methods described herein pertaining to mechanisms for feedback of multiple HARQ procedures in a same slot in mobile communications, including concepts, solutions, schemes and mechanisms described above with respect to network environment 100 and scenarios 200, 300 and 400 as well as process 600 described below.

Apparatus 510 may be a part of an electronic apparatus, which may be a UE such as a portable or mobile apparatus, a wearable apparatus, a wireless communication apparatus or a computing apparatus. For instance, apparatus 510 may be implemented in a smartphone, a smartwatch, a personal digital assistant, a digital camera, or a computing equipment such as a tablet computer, a laptop computer or a notebook computer. Apparatus 510 may also be a part of a machine type apparatus, which may be an IoT or NB-IoT apparatus such as an immobile or a stationary apparatus, a home apparatus, a wire communication apparatus or a computing apparatus. For instance, apparatus 510 may be implemented in a smart thermostat, a smart fridge, a smart door lock, a wireless speaker or a home control center. Alternatively, apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 510 may include at least some of those components shown in FIG. 5 such as a processor 512, for example. Apparatus 510 may further include one or more other components not pertinent to the proposed scheme of the present disclosure (e.g., internal power supply, display device and/or user interface device), and, thus, such component(s) of apparatus 510 are neither shown in FIG. 5 nor described below in the interest of simplicity and brevity.

Apparatus 520 may be a part of an electronic apparatus, which may be a network node such as a base station, a small cell, a router or a gateway. For instance, apparatus 520 may be implemented in an eNodeB in an LTE, LTE-Advanced or LTE-Advanced Pro network or in a gNB in a 5G, NR, IoT or NB-IoT network. Alternatively, apparatus 520 may be implemented in the form of one or more IC chips such as, for example and without limitation, one or more single-core processors, one or more multi-core processors, or one or more RISC or CISC processors. Apparatus 520 may include at least some of those components shown in FIG. 5 such as a processor 522, for example. Apparatus 520 may further include one or more other components not pertinent to the proposed scheme of the present disclosure (e.g., internal power supply, display device and/or user interface device), and, thus, such component(s) of apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more RISC or CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including mechanisms for feedback of multiple HARQ procedures in a same slot in mobile communications in accordance with various implementations of the present disclosure.

In some implementations, apparatus 510 may also include a transceiver 516 coupled to processor 512 and capable of wirelessly transmitting and receiving data. In some implementations, apparatus 510 may further include a memory 514 coupled to processor 512 and capable of being accessed by processor 512 and storing data therein. In some implementations, apparatus 520 may also include a transceiver 526 coupled to processor 522 and capable of wirelessly transmitting and receiving data. In some implementations, apparatus 520 may further include a memory 524 coupled to processor 522 and capable of being accessed by processor 522 and storing data therein. Accordingly, apparatus 510 and apparatus 520 may wirelessly communicate with each other via transceiver 516 and transceiver 526, respectively.

To aid better understanding, the following description of the operations, functionalities and capabilities of each of apparatus 510 and apparatus 520 is provided in the context of a mobile communication environment in which apparatus 510 is implemented in or as a UE (e.g., UE 110) and apparatus 520 is implemented in or as a network node (e.g., base station 125) of a wireless network (e.g., wireless network 120 as a 5G/NR mobile network).

In one aspect of mechanisms for feedback of multiple HARQ procedures in a same slot in mobile communications in accordance with the present disclosure, processor 512 may receive, via transceiver 516, a plurality of DL transmissions from apparatus 520 as a network node of a wireless network. Additionally, processor 512 may construct a feedback containing a plurality of HARQ-ACKs for the plurality of DL transmissions. Moreover, processor 512 may perform, via transceiver 516, an UL transmission of the feedback to the network node in a slot comprising a plurality of sub-slots, with each of the plurality of HARQ-ACKs being in a respective one of the plurality of sub-slots in the slot.

In some implementations, the plurality of sub-slots may have non-uniform sub-slot sizes.

In some implementations, in constructing the feedback containing the plurality of HARQ-ACKs, processor 512 may construct the feedback containing the plurality of HARQ-ACKs in one sub-slot of the plurality of sub-slots.

In some implementations, in constructing the feedback containing the plurality of HARQ-ACKs in the one sub-slot of the plurality of sub-slots, processor 512 may perform some operations. For instance, processor 512 may determine at least two HARQ-ACK codebooks for at least two HARQ-ACKs of the plurality of HARQ-ACKs. Additionally, processor 512 may construct the feedback to simultaneously contain the two HARQ-ACK codebooks within the one sub-slot of the plurality of sub-slots.

In some implementations, in determining the at least two HARQ-ACK codebooks, processor 512 may dynamically switch between two different HARQ procedures for each of the at least two HARQ-ACKs of the plurality of HARQ-ACKs using reserved K1 values. In the present disclosure, K1 may indicate a number of UL sub-slot boundaries between an ending symbol of a PDSCH and an ACK-reporting sub-slot or a starting symbol of a PUCCH carrying a respectively HARQ-ACK of the plurality of HARQ-ACKs.

In some implementations, in constructing the feedback containing the plurality of HARQ-ACKs in the one sub-slot of the plurality of sub-slots, processor 512 may determine one or more separate PUCCH allocations and one or more HARQ configurations for at least one HARQ-ACK of the plurality of HARQ-ACKS.

In some implementations, in constructing the feedback containing the plurality of HARQ-ACKs in the one sub-slot of the plurality of sub-slots, processor 512 may construct the feedback to contain one or more HARQ-ACK codebooks and at least one codebook-less HARQ-ACK feedback in the one sub-slot of the plurality of sub-slots.

In some implementations, in constructing the feedback containing the plurality of HARQ-ACKs in the one sub-slot of the plurality of sub-slots, processor 512 may perform some operations. For instance, processor 512 may select a first HARQ-ACK codebook for a first HARQ-ACK of the plurality of HARQ-ACKs corresponding to a first DL transmission of the plurality of DL transmissions. Moreover, processor 512 may select a second HARQ-ACK codebook for a second HARQ-ACK of the plurality of HARQ-ACKs corresponding to a second DL transmission of the plurality of DL transmissions. In such cases, the first HARQ-ACK codebook and the second HARQ-ACK codebook may be different. Additionally, the first DL transmission may have a first latency requirement for HARQ-ACK, and the second DL transmission may have a second latency requirement for HARQ-ACK different form the first latency requirement.

In some implementations, in selecting the first and the second HARQ-ACK codebooks, processor 512 may select the first and the second HARQ-ACK codebooks according to a PHY indication based on reserved values in a K1 index field in the control information or a K1 table stored in the UE. In such cases, control information in each of the DL transmissions may indicate a respective value of the K1 index field or the K1 table for a respective one of the plurality of HARQ-ACKs.

In some implementations, in constructing the feedback containing the plurality of HARQ-ACKs in the one sub-slot of the plurality of sub-slots, processor 512 may select a same HARQ-ACK codebook for a first HARQ-ACK and a second HARQ-ACK of the plurality of HARQ-ACKs corresponding to a first DL transmission and a second DL transmission of the plurality of DL transmissions, respectively. In such cases, the first DL transmission and the second DL transmission may have a same latency requirement for HARQ-ACK.

In some implementations, in selecting the same HARQ-ACK codebook, processor 512 may select the same HARQ-ACK codebook according to a PHY based on reserved values in a K1 index field in the control information or a K1 table stored in the UE. In such cases, control information in each of the DL transmissions may indicate a respective value of the K1 index field or the K1 table for a respective one of the plurality of HARQ-ACKs.

In some implementations, in constructing the feedback containing the plurality of HARQ-ACKs, processor 512 may construct the feedback containing the plurality of HARQ-ACKs in one sub-slot of the plurality of sub-slots and with a reduced PDSCH-to-HARQ processing time in an event that at least one of a plurality of conditions is true. In some implementations, the plurality of conditions may include the following: (a) a codebook-less HARQ is used; (b) there is no CBG-HARQ; (c) there are no multiple codewords; (d) there is no retransmission or soft combing; and (e) a short PUCCH format is transmitted.

In some implementations, in receiving the plurality of DL transmissions from the network node, processor 512 may receive signaling from the network node indicating a respectively HARQ procedure to be applied for each of the plurality of HARQ-ACKs. In such cases, in constructing of the feedback containing the plurality of HARQ-ACKs in the one sub-slot of the plurality of sub-slots, processor 512 may select the respective HARQ procedure for each of the plurality of HARQ-ACKs. In some implementations, in selecting the respective HARQ procedure for each of the plurality of HARQ-ACKs, processor 512 may select the respective HARQ procedure based on one or more of: (i) a reserved value in a K1 index field in receiving DCI or a K1 table stored in the UE; (ii) an RRC-configurable selectin of the respective HARQ procedure based on a type of the respective DCI; (iii) an RRC-configurable selection of the respective HARQ procedure based on a respective search space; and (iv) an RRC-configurable selection of the respective HARQ procedure based on a respective RNTI.

Illustrative Processes

Figure 6:
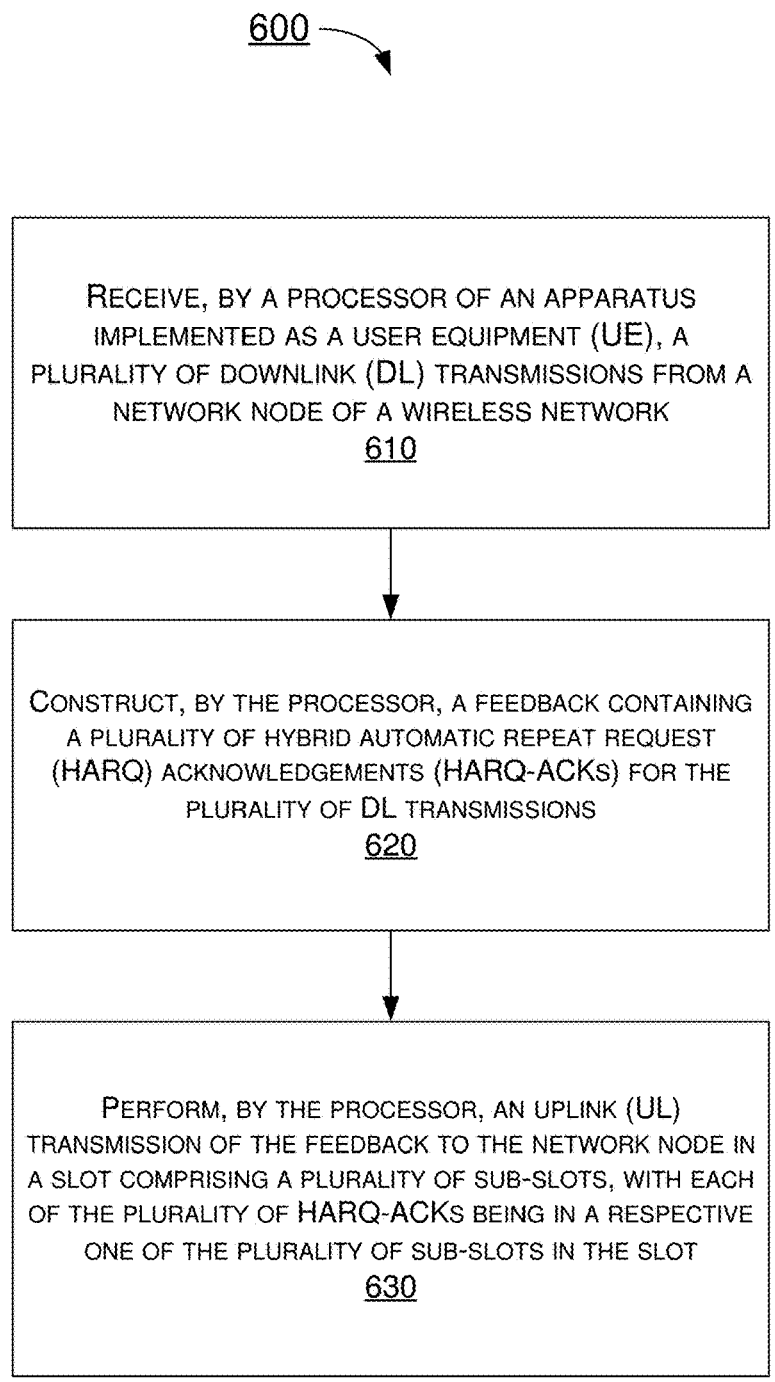
FIG. 6 is a flowchart of an example process in accordance with an implementation of the present disclosure.

FIG. 6 illustrates an example process 600 in accordance with an implementation of the present disclosure. Process 600 may be an example implementation of above-described concepts, solutions, schemes and mechanisms, whether partially or completely, with respect to mechanisms for feedback of multiple HARQ procedures in a same slot in mobile communications in accordance with the present disclosure. Process 600 may represent an aspect of implementation of features of apparatus 510 and apparatus 520. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by apparatus 510 and/or apparatus 520 or any suitable UE or machine type devices. Solely for illustrative purposes and without limitation, process 600 is described below in the context of apparatus 510 being implemented as a UE (e.g., UE 110) and apparatus 520 being implemented as a network node (e.g., base station 125) of a wireless network (e.g., wireless network 120 as a 5G/NR mobile network). Process 600 may begin at block 610.

At 610, process 600 may involve processor 512 of apparatus 510 as a UE receiving, via transceiver 516, a plurality of DL transmissions from apparatus 520 as a network node of a wireless network. Process 600 may proceed from 610 to 620.

At 620, process 600 may involve processor 512 constructing a feedback containing a plurality of HARQ-ACKs for the plurality of DL transmissions. Process 600 may proceed from 620 to 630.

At 630, process 600 may involve processor 512 performing, via transceiver 516, an UL transmission of the feedback to the network node in a slot comprising a plurality of sub-slots, with each of the plurality of HARQ-ACKs being in a respective one of the plurality of sub-slots in the slot.

In some implementations, the plurality of sub-slots may have non-uniform sub-slot sizes.

In some implementations, in constructing the feedback containing the plurality of HARQ-ACKs, process 600 may involve processor 512 constructing the feedback containing the plurality of HARQ-ACKs in one sub-slot of the plurality of sub-slots.

In some implementations, in constructing the feedback containing the plurality of HARQ-ACKs in the one sub-slot of the plurality of sub-slots, process 600 may involve processor 512 performing some operations. For instance, process 600 may involve processor 512 determining at least two HARQ-ACK codebooks for at least two HARQ-ACKs of the plurality of HARQ-ACKs. Additionally, process 600 may involve processor 512 constructing the feedback to simultaneously contain the two HARQ-ACK codebooks within the one sub-slot of the plurality of sub-slots.

In some implementations, in determining the at least two HARQ-ACK codebooks, process 600 may involve processor 512 dynamically switching between two different HARQ procedures for each of the at least two HARQ-ACKs of the plurality of HARQ-ACKs using reserved K1 values. In the present disclosure, K1 may indicate a number of UL sub-slot boundaries between an ending symbol of a PDSCH and an ACK-reporting sub-slot or a starting symbol of a PUCCH carrying a respectively HARQ-ACK of the plurality of HARQ-ACKs.

In some implementations, in constructing the feedback containing the plurality of HARQ-ACKs in the one sub-slot of the plurality of sub-slots, process 600 may also involve processor 512 determining one or more separate PUCCH allocations and one or more HARQ configurations for at least one HARQ-ACK of the plurality of HARQ-ACKS.

In some implementations, in constructing the feedback containing the plurality of HARQ-ACKs in the one sub-slot of the plurality of sub-slots, process 600 may involve processor 512 constructing the feedback to contain one or more HARQ-ACK codebooks and at least one codebook-less HARQ-ACK feedback in the one sub-slot of the plurality of sub-slots.

In some implementations, in constructing the feedback containing the plurality of HARQ-ACKs in the one sub-slot of the plurality of sub-slots, process 600 may involve processor 512 performing some operations. For instance, process 600 may involve processor 512 selecting a first HARQ-ACK codebook for a first HARQ-ACK of the plurality of HARQ-ACKs corresponding to a first DL transmission of the plurality of DL transmissions. Moreover, process 600 may involve processor 512 selecting a second HARQ-ACK codebook for a second HARQ-ACK of the plurality of HARQ-ACKs corresponding to a second DL transmission of the plurality of DL transmissions. In such cases, the first HARQ-ACK codebook and the second HARQ-ACK codebook may be different. Additionally, the first DL transmission may have a first latency requirement for HARQ-ACK, and the second DL transmission may have a second latency requirement for HARQ-ACK different form the first latency requirement.

In some implementations, in selecting the first and the second HARQ-ACK codebooks, process 600 may involve processor 512 selecting the first and the second HARQ-ACK codebooks according to a PHY indication based on reserved values in a K1 index field in the control information or a K1 table stored in the UE. In such cases, control information in each of the DL transmissions may indicate a respective value of the K1 index field or the K1 table for a respective one of the plurality of HARQ-ACKs.

In some implementations, in constructing the feedback containing the plurality of HARQ-ACKs in the one sub-slot of the plurality of sub-slots, process 600 may involve processor 512 selecting a same HARQ-ACK codebook for a first HARQ-ACK and a second HARQ-ACK of the plurality of HARQ-ACKs corresponding to a first DL transmission and a second DL transmission of the plurality of DL transmissions, respectively. In such cases, the first DL transmission and the second DL transmission may have a same latency requirement for HARQ-ACK.

In some implementations, in selecting the same HARQ-ACK codebook, process 600 may involve processor 512 selecting the same HARQ-ACK codebook according to a PHY based on reserved values in a K1 index field in the control information or a K1 table stored in the UE. In such cases, control information in each of the DL transmissions may indicate a respective value of the K1 index field or the K1 table for a respective one of the plurality of HARQ-ACKs.

In some implementations, in constructing the feedback containing the plurality of HARQ-ACKs, process 600 may involve processor 512 constructing the feedback containing the plurality of HARQ-ACKs in one sub-slot of the plurality of sub-slots and with a reduced PDSCH-to-HARQ processing time in an event that at least one of a plurality of conditions is true. In some implementations, the plurality of conditions may include the following: (a) a codebook-less HARQ is used; (b) there is no CBG-HARQ; (c) there are no multiple codewords; (d) there is no retransmission or soft combing; and (e) a short PUCCH format is transmitted.

In some implementations, in receiving the plurality of DL transmissions from the network node, process 600 may involve processor 512 receiving signaling from the network node indicating a respectively HARQ procedure to be applied for each of the plurality of HARQ-ACKs. In such cases, in constructing of the feedback containing the plurality of HARQ-ACKs in the one sub-slot of the plurality of sub-slots, process 600 may involve processor 512 selecting the respective HARQ procedure for each of the plurality of HARQ-ACKs. In some implementations, in selecting the respective HARQ procedure for each of the plurality of HARQ-ACKs, process 600 may involve processor 512 selecting the respective HARQ procedure based on one or more of: (i) a reserved value in a K1 index field in receiving DCI or a K1 table stored in the UE; (ii) an RRC-configurable selectin of the respective HARQ procedure based on a type of the respective DCI; (iii) an RRC-configurable selection of the respective HARQ procedure based on a respective search space; and (iv) an RRC-configurable selection of the respective HARQ procedure based on a respective RNTI.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  receiving, by a processor of an apparatus implemented as a user equipment (UE), a plurality of downlink (DL) transmissions from a network node of a wireless network;
  constructing, by the processor, a feedback containing a plurality of hybrid automatic repeat request (HARQ) acknowledgements (HARQ-ACKs) for the plurality of DL transmissions; and
  performing, by the processor, an uplink (UL) transmission of the feedback to the network node in a slot comprising a plurality of sub-slots,
    wherein each of the plurality of HARQ-ACKs is in a respective one of the plurality of sub-slots in the slot,
    wherein the receiving of the plurality of DL transmissions from the network node comprises receiving signaling from the network node indicating a respectively HARQ procedure to be applied for each of the plurality of HARQ-ACKs,
    wherein the constructing of the feedback containing the plurality of HARQ-ACKs comprises constructing the feedback containing the plurality of HARQ-ACKs in one sub-slot of the plurality of sub-slots and with a reduced physical downlink shared channel (PDSCH)-to-HARQ processing time in an event that at least one of a plurality of conditions is true, and wherein the plurality of conditions comprise:
    a codebook-less HARQ is used;
    there is no code block group (CBG)-HARQ; and
    there is no retransmission or soft combing.

2. The method of claim 1, wherein the plurality of sub-slots have non-uniform sub-slot sizes.

3. The method of claim 1, wherein the constructing of the feedback containing the plurality of HARQ-ACKs comprises constructing the feedback containing the plurality of HARQ-ACKs in one sub-slot of the plurality of sub-slots.

4. The method of claim 3, wherein the constructing of the feedback containing the plurality of HARQ-ACKs in the one sub-slot of the plurality of sub-slots comprises:
determining at least two HARQ-ACK codebooks for at least two HARQ-ACKs of the plurality of HARQ-ACKs; and
constructing the feedback to simultaneously contain the two HARQ-ACK codebooks within the one sub-slot of the plurality of sub-slots.

5. The method of claim 4, wherein the determining of the at least two HARQ-ACK codebooks comprises dynamically switching between two different HARQ procedures for each of the at least two HARQ-ACKs of the plurality of HARQ-ACKs using the reserved K1 values, and wherein K1 indicates a number of UL sub-slot boundaries between an ending symbol of a physical downlink share channel (PDSCH) and an ACK-reporting sub-slot or a starting symbol of a physical uplink control channel (PUCCH) carrying a respectively HARQ-ACK of the plurality of HARQ-ACKs.

6. The method of claim 4, wherein the constructing of the feedback containing the plurality of HARQ-ACKs in the one sub-slot of the plurality of sub-slots further comprises determining one or more separate physical uplink control channel (PUCCH) allocations and one or more HARQ configurations for at least one HARQ-ACK of the plurality of HARQ-ACKS.

7. The method of claim 3, wherein the constructing of the feedback containing the plurality of HARQ-ACKs in the one sub-slot of the plurality of sub-slots comprises constructing the feedback to contain one or more HARQ-ACK codebooks and at least one codebook-less HARQ-ACK feedback in the one sub-slot of the plurality of sub-slots.

8. The method of claim 3, wherein the constructing of the feedback containing the plurality of HARQ-ACKs in the one sub-slot of the plurality of sub-slots comprises:
selecting a first HARQ-ACK codebook for a first HARQ-ACK of the plurality of HARQ-ACKs corresponding to a first DL transmission of the plurality of DL transmissions; and
selecting a second HARQ-ACK codebook for a second HARQ-ACK of the plurality of HARQ-ACKs corresponding to a second DL transmission of the plurality of DL transmissions,
wherein the first HARQ-ACK codebook and the second HARQ-ACK codebook are different,
wherein the first DL transmission has a first latency requirement for HARQ-ACK, and
wherein the second DL transmission has a second latency requirement for HARQ-ACK different form the first latency requirement.

9. The method of claim 8, wherein the selecting of the first and the second HARQ-ACK codebooks comprises selecting the first and the second HARQ-ACK codebooks according to a physical layer (PHY) indication based on reserved values in a K1 index field in the control information or a K1 table stored in the UE, wherein control information in each of the DL transmissions indicates a respective value of the K1 index field or the K1 table for a respective one of the plurality of HARQ-ACKs, and wherein K1 indicates a number of UL sub-slot boundaries between an ending symbol of a physical downlink share channel (PDSCH) and an ACK-reporting sub-slot or a starting symbol of a physical uplink control channel (PUCCH) carrying a respectively HARQ-ACK of the plurality of HARQ-ACKs.

10. The method of claim 3, wherein the constructing of the feedback containing the plurality of HARQ-ACKs in the one sub-slot of the plurality of sub-slots comprises:
selecting a same HARQ-ACK code book for a first HARQ-ACK and a second HARQ-ACK of the plurality of HARQ-ACKs corresponding to a first DL transmission and a second DL transmission of the plurality of DL transmissions, respectively,
wherein the first DL transmission and the second DL transmission have a same latency requirement for HARQ-ACK.

11. The method of claim 10, wherein the selecting of the same HARQ-ACK codebook comprises selecting the same HARQ-ACK codebook according to a physical layer indication (PHY) based on reserved values in a K1 index field in the control information or a K1 table stored in the UE, wherein control information in each of the DL transmissions indicates a respective value of the K1 index field or the K1 table for a respective one of the plurality of HARQ-ACKs, and wherein K1 indicates a number of UL sub-slot boundaries between an ending symbol of a physical downlink share channel (PDSCH) and an ACK-reporting sub-slot or a starting symbol of a physical uplink control channel (PUCCH) carrying a respectively HARQ-ACK of the plurality of HARQ-ACKs.

12. The method of claim 1, wherein the plurality of conditions further comprise:
a short physical uplink control channel (PUCCH) format is transmitted.

13. An apparatus implemented as a user equipment (UE), comprising:
a transceiver configured to wirelessly communicate with a network node of a wireless network; and
a processor coupled to the transceiver and configured to perform operations comprising:
receiving, via the transceiver, a plurality of downlink (DL)transmissions from the network node of the wireless network;
constructing a feedback containing a plurality of hybrid automatic repeat request (HARQ) acknowledgements (HARQ-ACKs) for the plurality of DL transmissions; and
performing, via the transceiver, an uplink (UL) transmission of the feedback to the network node in a slot comprising a plurality of sub-slots,
wherein each of the plurality of HARQ-ACKs is in a respective one of the plurality of sub-slots in the slot,
wherein, in receiving the plurality of DL transmissions from the network node, the processor receives signaling from the network node indicating a respectively HARQ procedure to be applied for each of the plurality of HARQ-ACKs,
wherein the constructing of the feedback containing the plurality of HARQ-ACKs comprises constructing the feedback containing the plurality of HARQ-ACKs in one sub-slot of the plurality of sub-slots and with a reduced physical downlink shared channel (PDSCH)-to-HARQ processing time in an event that at least one of a plurality of conditions is true, and
wherein the plurality of conditions comprise:
a codebook-less HARQ is used;
there is no code block group (CBG)-HARQ; and
there is no retransmission or soft combing.

14. The apparatus of claim 13, wherein, in constructing the feedback containing the plurality of HARQ-ACKs in the one sub-slot of the plurality of sub-slots, the processor is configured to perform operations comprising:

determining at least two HARQ-ACK codebooks for at least two HARQ-ACKs of the plurality of HARQ-ACKs; and constructing the feedback to simultaneously contain the two HARQ-ACK codebooks within the one sub-slot of the plurality of sub-slots.

15. The apparatus of claim 14, wherein, in determining the at least two HARQ-ACK codebooks, the processor is configured to dynamically switch between two different HARQ procedures for each of the at least two HARQ-ACKs of the plurality of HARQ-ACKs using reserved K1 values, and wherein K1 indicates a number of UL sub-slot boundaries between an ending symbol of a physical downlink share channel (PDSCH) and an ACK-reporting sub-slot or a starting symbol of a physical uplink control channel (PUCCH) carrying a respectively HARQ-ACK of the plurality of HARQ-ACKs.

16. The apparatus of claim 14, wherein, in constructing the feedback containing the plurality of HARQ-ACKs in the one sub-slot of the plurality of sub-slots, the processor is further configured to determine one or more separate physical uplink control channel (PUCCH) allocations and one or more HARQ configurations for at least one HARQ-ACK of the plurality of HARQ-ACKS.

\* \* \* \* \*